United States Patent Office
3,542,850
Patented Nov. 24, 1970

3,542,850
SUBSTITUTED ANILIDES
Alexander Bertus Arnold Jansen, Burnam, and John Hollowood, Stonor, Henley-on-Thames, England, assignors, by mesne assignments, to John Wyeth & Brother Limited, Taplow, Maidenhead, Berkshire, England, a British company
No Drawing. Filed May 19, 1967, Ser. No. 639,622
Claims priority, application Great Britain, June 3, 1966, 24,763/66
Int. Cl. C07c 103/28, 103/50
U.S. Cl. 260—471
16 Claims

ABSTRACT OF THE DISCLOSURE

The compounds of the class of ω-dialkylamino-2-methylacetanilide derivatives useful as an anti-convulsant and local anaesthetic.

BACKGROUND OF THE INVENTION

This invention relates to the field of new physiologically active ω-dialkylamino-2-methylacetanilide compounds and the novel processes for their preparation.

In U.S. Pat. No. 2,441,498 there is disclosed the preparation of ω-diethylamino-2,6-dimethylacetanilide (lignocaine), which is useful as a local anaesthetic.

Lofgren et al. in Acta Chemica Scandinavia 9 (1955) pp. 493–496, describes the preparation of β-imino-β-ethoxy-2,6-dimethylpropionanilide which shows only slight anaesthetic activity when compared with lignocaine.

SUMMARY OF THE INVENTION

More particularly, this invention is directed to a compound of the formula:

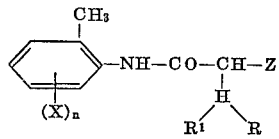

and the pharmaceutically acceptable acid addition salts thereof, wherein X is selected from the group consisting of hydrogen, lower alkyl, lower alkoxy, nitro, halo, trifluoromethyl, amino, di(lower alkyl)amino, mono(lower alkyl)amino, benzyloxy and lower alkyl mercapto; $n$ is one, two or three; R and $R^1$ are each selected from the group consisting of hydrogen, lower alkyl and hydroxy alkyl; and Z is selected from the group consisting of lower alkenyl, lower alkynyl, mercapto lower alkyl, hydroxy lower alkyl, acyloxymethyl, benzylthio lower alkyl, lower alkoxy carbonyl, carbamoyl and amido-substituted lower alkyl lower alkyl disulfide.

The terms "lower alkyl," "lower alkoxy," "lower alkenyl" and "lower alkynyl," as employed herein, include both straight and branched chain radicals of less than eight carbon atoms.

As to salts, those coming within the purview of this invention include the acid-addition salts, particularly the non-toxic acid-addition salts. Acids useful for preparing these acid-addition salts include, inter alia, inorganic acids, such as the hydrohalic acids (e.g., hydrochloric acid and hydrobromic acid), sulfuric acid, nitric acid, boric acid and phosphoric acid, and organic acids such as maleic, methane sulfonic, cyclohexane sulfonic, tartaric, citric, acetic and succinic acid.

Among the suitable radicals represented by the symbol Z are: lower alkenyl (e.g., butenyl, allyl), lower alkynyl (e.g., butynyl, propargyl), mercapto lower alkyl (e.g., mercaptomethyl, 1-mercapto-isopropyl), hydroxy lower alkyl (e.g., hydroxymethyl, 2-hydroxyethyl, 2,3-dihydroxy-n-propyl), acyloxymethyl (e.g., acetoxymethyl), benzylthio lower alkyl (e.g. benzylthiomethyl), lower alkoxy carbonyl (e.g., ethoxy carbonyl), carbamoyl, amido-substituted lower alkyl lower alkyl disulfide (e.g., β - dimethylamino - β - (2′,6′-dimethyl-phenylaminocarbonyl)-ethyl methyl disulfide, β-diethylamino-β-(2′,6′-dimethylphenylaminocarbonyl)-ethyl isopropyl disulfide), and the like.

The final products of this invention are physiologically active substances which are useful as anti-convulsant and local anaesthetic. Hence, they may be administered to mammals in lieu of known local anaesthetics such as lignocaine.

The compounds may be formulated for such administration based on the activity of the particular compound and the requirements of the patient.

DESCRIPTION OF THE PREFERRED EMBODIMENTS

The compounds of this invention may be prepared by a variety of methods.

One such method involves the reaction of an aniline compound of the Formula II:

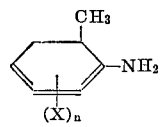

or the salts thereof, wherein X and $n$ are as hereinbefore described, either with (i) an α-halogen-a($Z^1$-substituted)-acetylating agent or an α - ($Z^1$ - substituted)-acylating agent followed by halogenating the α-carbon atom, and in either case subsequently effecting reaction with an amine of the general formula $HNRR^1$, or (ii) reacting the aniline of general Formula II with an α-($NH$-$R^1$-substituted)-α-($Z^1$-substituted)-acetylating agent, in which R and $R^1$ are as hereinbefore defined, and $Z^1$ has the same meaning as Z or is a radical capable of being converted into a radical Z. In either (i) or (ii), the radical $Z^1$ may be converted to the radical Z, if necessary.

For example, an aniline compound of the general Formula II can be reacted with an acid halide of the general formula:

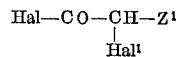

or the corresponding acid anhydride, and then with the amine of general formula $NHRR^1$ in which Hal and $Hal^1$ are halogen atoms and R, $R^1$ and $Z^1$ are as hereinbefore defined. The radical Hal preferably is chlorine and the radical $Hal^1$ preferably is bromine.

Alternatively, the final products of this invention can be prepared by the steps of:

(A) Reacting an aniline compound of the general Formula II with an acid halide of the general formula:

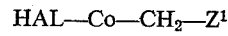

wherein Hal and $Z^1$ are as hereinbefore defined, or the corresponding acid or anhydride, to yield the product of the Formula V:

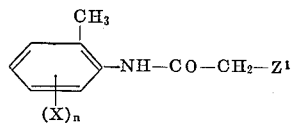

wherein X, $n$ and $Z^1$ are as hereinbefore defined;

(B) Reacting said compound of Formula V with a halogen (e.g., bromine); and then, (C) Treating the product formed with an amine of the general formula HNRR[1], wherein R and R[1] are as hereinbefore defined.

A still further method of preparing the compounds of the invention is to react an aniline compound of general Formula II with an acid of the general formula:

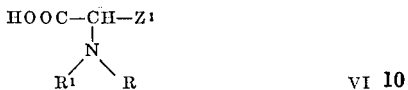

or the corresponding halide or anhydride, in which R, R[1] and Z[1] are as hereinbefore defined.

The initial compounds of general Formulae II, III, IV and VI are commercially available or can be readily prepared from a dicarboxylic acid, e.g., malonic acid, or a halide or anhydride thereof. For example, an alkyl malonyl halide (preferably ethyl malonyl chloride) can be reacted with 2,6-xylidine to give α-carboethoxy-2,6-xylidide. Bromination of the α-carbon atom and subsequent reaction with a primary or secondary amine (e.g., diethylamine) yields an α-carboethoxy-α-(substituted amino)-2,6-xylidide.

If desired, α-carboethoxy-α-(substituted amino)-2,6-xylidide can be reduced (e.g., with lithium borohydride in tetrahydrofuran) to an α-(substituted amino)-α-hydroxymethyl-2,6-xylidide. The compound may optionally be acylated, e.g. acetylated, with an acylating agent. An acyl halide or preferably an anhydride, such as acetic anhydride may be used.

It is also possible to react an α-bromo malonic acid monoester directly with 2,6-xylidine and then to carry out the amination, and possible reduction.

In some cases, e.g. when the radical Z contains a grouping which is attacked by bromine (e.g. a double or triple bond), it is advisable first to brominate and aminate the dicarboxylic acid derivative (e.g. a dialkyl malonate, such as dibutyl malonate) and then to react the amino intermediate with an alkali metal (e.g. sodium) or a hydride thereof and the halide of the desired radical to be introduced. For example, a dialkyl malonate (e.g. diethyl malonate) can be brominated and aminated (e.g. with diethylamine) to give a dialkyl α-(substituted amino) malonate which on reaction with an alkali metal hydride and e.g. an allyl halide yields a dialkyl α-(substituted amino)α-allyl-malonate. Hydrolysis and decarboxylation with an alkali can then be effected to give the monocarboxylic acid which is reacted with 2,6-xylidine. The corresponding propargyl compound can be prepared in a similar manner but in this case we have found it necessary to get good yields to start with the di-tert. butyl ester, and to effect hydrolysis and decarboxylation with an acid ester.

When the radical Z in the compounds of general Formula I contain a sulphur atom, the compounds generally can be prepared starting from readily available appropriate sulphur-containing acids. For example cysteine can be S-benzylated and methylated on the nitrogen atom to form a N,N-dimethyl-S-benzyl cysteine which can be reacted with 2,6-xylidine, (e.g. in the presence of a carbodiimide or preferably ethoxyformic anhydride) to give S-benzyl-N,N-dimethylcysteinyl-2',6'-xylidide. To prepare homologues where R and R[1] are other than methyl, benzylthiomethyl bromide (prepared by bromination of the chloride) may be reacted with a di-tertiary butyl dialkylamino malonate, followed by hydrolysis and decarboxylation and to react the S-benzyl-N,N-dialkylcysteine formed with 2,6-xylidine.

Treatment of a S-benzyl-N,N-dialkylcysteinyl-2',6'-xylidide with an alkali metal (e.g. sodium) in liquid ammonia causes debenzylation to occur with formation of the disulphide, N,N-dalkylcystinyl-2',6'-xylidide. On the other hand, debenzylation in liquid ammonia under non-oxidising conditions causes formation of the mercaptan, N,N-dialkyl-cysteinyl-2,6-xylidide, especially if this compound is allowed to form as the hydrochloride.

The following non-limiting examples illustrate the invention. In these examples, light petroleum refers to the fraction of B.P. 60–80° C.

EXAMPLE 1

2-ethoxycarbonyl-2-diethylaminoaceto-2',6'-xylidide (A) A solution of monoethylmalonate (44 g., 0.330 mole), prepared according to Organic Syntheses collective volume IV page 417, and freshly distilled 2,6-xylidine (40.5 g., 41.5 ml., 0.330 mole) in methylene chloride (500 ml.) was cooled to 0° C. Dicyclohexylcarbodiimide (76 g., 10% excess) was added and the mixture stirred at 0° C. for 1 hour and then at room temperature for 16 hours. A dense precipitate of dicyclohexylurea separated. Glacial acetic acid (5 ml.) was then added and the mixture stirred for a further hour. The dicyclohexylurea was filtered off and the solvent evaporated to give a pale pink solid (76 g.). This was recrystallized from light petroleum-ethyl acetate to yield 2-ethoxycarbonylaceto-2',6'-xylidide as colorless needles, 70.1 g. (90%), M.P. 100–101° C.

(B) 2 - ethoxycarbonylaceto-2',6'-xylidide (11.7 g., 0.050 mole) was dissolved in chloroform (100 ml.) and bromine (10.0 g., 3.5 ml., 0.0625 mole) was added over a period of 30 minutes while stirring well at room temperature. The mixture was stirred for a further 30 minutes at room temperature after the addition of the bromine and then heated under reflux for 30 minutes. The pale yellow solution which formed was cooled, washed with water (20 ml.), 2 N sodium bicarbonate solution (20 ml.) water (20 ml.) and then dried over $MgSO_4$. The chloroform was evaporated to give a pale yellow solid (15.1 g.). Recrystallization from ether yielded 11.84 g. (76%), of 2-bromo-2-ethoxycarbonylaceto - 2',6' - xylidide, M.P. 134–135° C.

(C) 2-bromo-2-ethoxycarbonylaceto - 2',6' - xylidide (9.42 g., 0.030 mole) was dissolved in absolute ethanol (75 ml.). Diethylamine (6.6 g., 9.3 ml., 0.090 mole) was added and the mixture heated under reflux for 6 hours. The dark red solution was cooled and the ethanol, together with the excess diethylamine, was evaporated to give a red oil. Water (100 ml.) and ether (100 ml.) were added to the residue. The ethereal layer was separated and the aqueous layer extracted with further portions of ether (2× 50 ml.). The combined ethereal extracts were dried over $MgSO_4$ and the ether evaporated to give a red oil (8.42 g.), which was taken up in anhydrous ether (50 ml.) and ethereal hydrogen chloride added. A sticky orange solid was deposited. The ethereal layer was decanted and the solid dissolved in the minimum amount of hot isopropyl alcohol then anhydrous ether added until the solution was turbid. The mixture was allowed to stand overnight in a refrigerator when a crystalline, colorless solid (7.06 g.) was deposited. Recrystallization from ether-isopropanol furnished colorless needles of 2-ethoxycarbonyl-2-diethylaminoaceto-2',6'-xylidide hydrochloride (6.65 g., 65%), M.P. 169–170° C.

Analysis.—Found (percent): C, 59.3; H, 7.85; Cl, 10.9; N, 8.3. $C_{17}H_{27}ClN_2O_3$ requires (percent): C, 59.7; H, 8.0; Cl, 10.4; N, 8.2.

The free base was obtained by adding 2 N sodium hydroxide (20 ml.) to the above hydrochloride (3.424 g., 0.010 mole). A sticky white solid was precipitated. This was extracted into ether (3× 50 ml.) and the ethereal extracts washed with water (20 ml.) and dried ($MgSO_4$). The ether was evaporated to give a white solid (2.98 g.) which was recrystallized from light petroleum to give colorless needles of 2-ethoxycarbonyl-2-diethylaminoaceto-2',6'-xylidide (2.75 g., 90%) M.P. 73–75° C.

2-ethoxycarbonyl - 2 - diethylaminoaceto-2',6'-xylidide was also prepared by brominating ethyl malonyl chloride, reacting the 2 - bromo - 2-ethoxycarbonyl-2,6-xylidide formed (of M.P. 134–135° C.) with diethylamine.

EXAMPLE 2

2-ethoxycarbonyl-2-diethylaminoaceto-2'-methylanilide

Following the procedure of Example 1, but substituting 2-methylaniline for 2,6-xylidine in part (A), there is obtained 2-ethoxycarbonyl - 2 - diethylaminoaceto-2'-methylanilide.

EXAMPLE 3

2-ethoxycarbonyl-2-diethylaminoaceto-2'-methyl-4'-chloroanilide

Following the procedure of Example 1, but substituting 2-methyl-4-chloroaniline for 2,6-xylidine in part (A) there is obtained 2-ethoxycarbonyl-2-diethylaminoaceto-2'-methyl-4'-chloroacetanilide.

EXAMPLE 4

2-ethoxycarbonyl-2-diethylaminoaceto-2'-methyl-4'-trifluoromethylanilide

Following the procedure of Example 1, but substituting 2-methyl-4-trifluoromethylaniline for 2,6-xylidine in part (A) there is obtained 2-ethoxycarbonyl-2-diethylaminoaceto-2'-methyl-4'-trifluoromethylanilide.

EXAMPLE 5

2-ethoxycarbonyl-2-diethylaminoaceto-2'-methyl-4'-methoxyanilide

Following the procedure of Example 1, but substituting 2-methyl-4-methoxaniline for 2,6-xylidine in part (A) there is obtained 2-ethoxycarbonyl-2-diethylaminoaceto-2'-methyl-4'-methoxyanilide.

EXAMPLE 6

2-ethoxycarbonyl-2-diethylaminoaceto-2'-methyl-4'-benzyloxyanilide

Following the procedure of Example 1, but substituting 2-methyl-4-benzyloxyaniline for 2,6-xylidine in part (A) there is obtained 2-ethoxycarbonyl-2-diethylamino-aceto-2'-methyl-4'-benzyloxyanilide.

EXAMPLE 7

2-ethoxycarbonyl-2-diethylaminoaceto-2'-methyl-4'-nitroanilide

Following the procedure of Example 1, but substituting 2-methyl-4-nitroaniline for 2,6-xylidine in part (A) there is obtained 2-ethoxycarbonyl-2-diethylaminoaceto-2'-methyl-4'-nitroanilide.

EXAMPLE 8

2-ethoxycarbonyl-2-diethylaminoaceto-2'-methyl-4'-dimethylaminoanilide

Following the procedure of Example 1, but substituting 2-methyl-4-dimethylaminoaniline for 2,6-xylidine in part (A) there is obtained 2-ethoxycarbonyl-2-diethylaminoaceto-2'-methyl-4'-dimethylaminoanilide.

EXAMPLE 9

2-ethoxycarbonyl-2-diethylaminoaceto-2'-methyl-4'-ethylthioanilide

Following the procedure of Example 1, but substituting 2-methyl-4-ethylthioaniline for 2,6-xylidine in part (A) there is obtained 2-ethoxycarbonyl-2-diethylamino-aceto-2'-methyl-4'-ethylthioacetanilide.

EXAMPLE 10

2-diethylamino-2-hydroxymethylaceto-2',6'-xylidide hydrochloride

2 - ethoxycarbonyl-2-diethylamino aceto-2',6'-xylidide (1.53 g. 0.005 mole) was dissolved in freshly distilled, dry tetrahydrofuran (60 ml.) and lithium borohydride (1.1 g., 0.05 mole) added. The mixture was heated under reflux for 48 hours, cooled and water (10 ml.) added cautiously to decompose the excess lithium borohydride. 2 N sodium hydroxide (20 ml.) was then added and the mixture extracted with ether (3× 100 ml.). The ethereal extracts were dried over $MgSO_4$ and the ether was evaporated to give an oil (1.355 g.). This was taken up in anhydrous ether (20 ml.), ethereal hydrogen chloride was added and a sticky white solid was deposited. The ethereal layer was decanted and the solid recrystallized from methyl ethyl ketone to yield colorless needles of 2 - diethylamino-2-hydroxymethylaceto-2',6'-xylidide hydrochloride (1.144 g., 76%), M.P. 184–185° C.

*Analysis.*—Calcd. for $C_{15}H_{25}ClN_2O_2$ (percent): C, 60.06; H, 8.4; Cl, 11.8; N, 9.3. Found (percent): C, 59.75; H, 8.5; Cl, 11.75; N, 9.2.

Similarly, by substituting another inorganic acid or organic acid for hydrogen chloride the corresponding acid-addition salt may be obtained.

EXAMPLE 11

2-diethylaminopent-4-enoyl-2',6'-xylidide hydrochloride (A) Diethyl - diethylaminomalonate (4.6 g.) in dry ether (10 ml.) was added to sodium hydride (1 g., 50% in oil) which had been thrice washed with and then suspended in dry ether (10 ml.). After the evolution of hydrogen has ceased most of the ether was distilled off and the remainder removed in vacuo. Allyl bromide (1.8 ml.) was added to the residual sodio-derivative dissolved in dry dimethyl sulphoxide (15 ml.). Precipitation of sodium bromide began after a few minutes. After 16 hours water was added and the diethyl-α-allyl-α-diethylaminomalonate formed was collected in ether and distilled. Yield 3.45 g. of B.P. 80–90° C./0.4 mm.

(B) A mixture of diethyl-α-allyl-α-diethylaminomalonate (35 g.), 2 N-sodium hydroxide (131 ml.) and sufficient ethanol to give a single phase was heated on a steam bath under reflux for 5 hours. The solution was concentrated in vacuo, water was added and the mixture was extracted with ether. The aqueous phase was acidified slowly with 2 N-sulphuric acid to pH4 and then evaporated to dryness in vacuo. Digestion of the solid with ethanol, evaporation of the solution and trituration of the residue with acetone gave crystalline 2-diethylamino-pent-4-enoic acid, M.P. 133–6° C.

(C) Ethyl chlorformate (1 ml.) was added to an ice-cold solution of 2-diethylaminopent-4-enoic acid (1.7 g.) and triethylamine (1.4 ml.) in chloroform (6 ml.), followed after 15 min. by 2,6-xylidine (1.2 ml.). A sluggish evolution of carbon dioxide was observed. After 48 hr. at room temperature the mixture was poured into water and the organic layer was separated and evaporated. The residue was taken up in dilute hydrochloric acid, the solution washed with ether and then extracted twice with chloroform. Evaporation of the chloroform yielded a gum which crystallized from tetrahydrofuran to give 2-diethylaminopent-4-enoyl-2',6'-xylidide as prisms (1 g.), M.P. 209–210° C. (with decomp.) after recrystallization from ethanol.

*Analysis.*—Calcd. for $C_{17}H_{26}N_2O \cdot HCl$ (percent): C, 65.5; H, 8.7; N, 9.0. Found (percent): C, 65.5; H, 8.75; N, 8.9.

EXAMPLE 12

2-diethylaminopent-4-ynonyl-2',6'-xylidide hydrochloride (A) A mxiture of 45 g. of di-tert butyl α-bromomalonate (B.P. 120–125° C./11 mm.), diethylamine (40 ml.), and ethanol (150 ml.) was refluxed for 2 hours and then concentrated in vacuo. Water was added and the product was collected in ether, then extracted into dilute hydrochloric acid and finally extracted back again into ether after basification of the aqueous extract. After removal of the solvent the residual oil (36 g.) was distilled to provide di-tert butyl α-diethylaminomalonate, B.P. 94–100° C./1.7 mm.

(B) 19.4 g. of di-tert butyl α-diethylaminomalonate was added dropwise to a stirred suspension of ether-washed sodium hydride (3.3 g., 50% suspension in oil) in dimethyl sulphoxide (25 ml.). After 1 hour when the solution was clear, propargyl bromide (5.2 ml.) was added dropwise. Twelve hours later, water was added and the di-tert butyl-α-diethylamino-α-propargyl-malonate formed (22.4 g.) was collected in ether, dried over MgSO$_4$ and distilled, B.P. 102–110° C./0.8 mm.

(C) The di-tert-butyl α-diethylamino - α - propargyl-malonate (8.0 g.) was heated on a steam bath with 2 N-hydrochloric acid (40 ml.) for 1 hour and, after cooling, the solution was treated with the ion-exchange resin known as De-Acidite FF (HCO$_3$ form) until neutral. The liquor was washed with ether and then evaporated to dryness under reduced pressure to yield crystalline α-diethyl-amino-α-propargyl acetic acid (3.2 g.), recrystallization of which form acetone afforded prisms of M.P. 130–132° C. Ethyl chloroformate (1.3 ml.) was added dropwise to an ice-cold solution of this acid (2.3 g.) and tri-ethylamine (1.9 ml.) in chloroform (10 ml.), followed after 15 min. by 2,6-xylidine (1.7 ml.). After standing for several days at room temperature the mixture was poured into water, basified as necessary with sodium bicarbonate, and the organic layer collected. The chloroform was evaporated, ether was added and the solution was extracted with hydrochloric acid. On shaking the aqueous acid extract with chloroform the hydrochloride of the product passed into the organic layer. Evaporation of the solvent and trituration of the residue with tetrahydrofuran gave crystalline 2-diethylaminopent-4-ynoyl-2',6'-xylidide hydrochloride (1.8 g.), M.P. 198–200° C. Recrystallization from ethanol/ethyl acetate gave a M.P. 202–204° C.

Analysis.—Calcd. for $C_{17}H_{24}N_2O_4 \cdot HCl$ (percent): C, 66.1; H, 8.2; N, 9.1. Found (percent): C, 66.1; H, 7.9; N, 8.9.

EXAMPLE 13

2-diethylaminopent-4-ynoyl-2'-methylanilide

Following the procedure of Example 12, but substituting 2-methylaniline for 2,6-xylidine in part (C) there is obtained 2-diethylaminopent-4-ynoyl-2'-methylanilide.

EXAMPLE 14

2-diethylaminopent-4-ynoyl-2'-methyl-4'-chloroanilide

Following the procedure of Example 12, but substituting 2-methyl-4-chloroaniline for 2,6-xylidine in part (C) there is obtained 2-diethylaminopent-4-ynoyl-2'-methyl-4'-chloroanilide.

EXAMPLE 15

2-diethylaminopent-4-ynoyl-2'-methyl-4'-trifluoromethylanilide

Following the procedure of Example 12, but substituting 2-methyl-4-trifluoromethylaniline for 2,6-xylidine in part (C) there is obtained 2-diethylaminopent-4-ynoyl-2'-methyl-4'-trifluoromethylanilide.

EXAMPLE 16

2-diethylaminopent-4-ynoyl-2'-methyl-4'-methoxyanilide

Following the procedure of Example 12, but substituting 2-methyl-4-methoxyaniline for 2,6-xylidine in part (C) there is obtained 2-diethylaminopent-4-ynoyl-2'-methyl-4-methoxyanilide.

EXAMPLE 17

2-diethylaminopent-4-ynoyl-2'-methyl-4'-benzyloxyanilide

Following the procedure of Example 12, but substituting 2-methyl-4-benzyloxyaniline for 2,6-xylidine in part (C) there is obtained 2-diethylaminopent-4-ynoyl-2'-methyl-4'-benzyloxyanilide.

EXAMPLE 18

2-diethylaminopent-4-ynoyl-2'-methyl-4'-nitroanilide

Following the procedure of Example 12, but substituting 2-methyl-4-nitroaniline for 2,6-xylidine in part (C) there is obtained 2-diethylaminopent-4-ynoyl-2'-methyl-4'-nitroanilide.

EXAMPLE 19

2-diethylaminopent-4-ynoyl-2'-methyl-4'-diethylaminoanilide

Following the procedure of Example 12, but substituting 2-methyl-4-diethylaminoaniline for 2,6-xylidine in part (C) there is obtained 2-diethylaminopent-4-ynoyl-2'-methyl-4'-diethylaminoanilide.

EXAMPLE 20

2-diethylaminopent-4-ynoyl-2'-methyl-4'-ethylthioanilide

Following the procedure of Example 12, but substituting 2-methyl-4-ethylthioaniline for 2,6-xylidine in part (C) there is obtained 2-diethylaminopent-4-ynoyl-2'-methyl-4'-ethylthioanilide.

EXAMPLE 21

L-S-benzyl-N,N-dimethylcysteinyl-2',6'-xylidide

A suspension of L-S-benzylcysteine (20 g.) in water (1 l.) and formaldehyde (30 ml. 40%) was shaken with hydrogen at room temperature and pressure in the presence of palladium (10%)-charcoal catalyst (10 g.). Gas uptake ceased ta approximately the theorectical volume. The solution was filtered and evaporated under reduced pressure, and the residue was digested with water (200 ml.). After removal of the insoluble material the solution was again evaporated to dryness and the resulting solid was crystallized from ethyl acetate to give L-S-benzyl-N,N-dimethylcysteine (13.4 g.) as prisms M.P. 150° C. Ethyl chlorformate (3.4 ml.) was added to an ice-cold solution of L-S-benzyl-N,N-dimethylcysteine in triethylamine (4.8 ml.) and dimethyl-formamide (40 ml.), followed after min. by 2,6-xylidine (4.3 ml.). After 48 hours at room temperature water was added and the product was collected in ether. The etheral solution was shaken with dilute hydrochloric acid and the aqueous phase, together with some heavy oil which had separated, was extracted with chloroform. The chloroform solution, which contained the desired xylidide as its hydrochloride, was shaken with sodium bicarbonate solution to liberate the free base and then evaporated. From the resulting viscous oil (5.9 g.) crystals of L-S-benzyl-N,N-dimethylcysteinyl - 2',6' - xylidide slowly separated. After filtration and washing with isopropyl ether, these (2.9 g.) were recrystallized from isopropyl ether to give prisms of M.P. 80–81° C., $[d]_D^{20}+117.45°$ (C.=1, H$_2$O).

Analysis.—Calcd. for $C_{20}H_{26}N_2OS$ (percent): C, 70.15; H, 7.65; N, 8.2. Found (percent): C, 70.0; H, 7.6; N, 8.1.

EXAMPLE 22

L-N,N-dimethylcystinyl-2',6'-xylidide hydrochloride

Sodium (0.7 g.) was added in small pieces to a suspension of the product of Example 21 (1.7 g.) in liquid ammonia (100 ml.) until the blue color persisted. Sufficient ammonium chloride to discharge the color was added and the ammonia was allowed to evaporate. The residue in 2 N-hydrochloric acid (20 ml.) was washed with ether and the solution was then basified with sodium bicarbonate. The precipitate was redissolved in hydrochloric acid and the product (as the hydrochloride) was extracted into chloroform. Evaporation of the solvent left L-N,N-dimethylcystinyl-2′,6′-xylidide hydrochloride as a crystalline residue (0.75 g.) M.P. 213–216° C., $$[d]_D^{20} + 122°$$

(c.=1, $H_2O$) recrystallization from ethyl acetate.

*Analysis.*—Calcd. for $C_{26}H_{38}N_4O_2S_2 \cdot 2HCl$ (percent): C, 54.2; H, 7.0; N, 9.7; S, 11.1. Found (percent): C, 53.6; H, 7.1; N, 9.35; S, 10.3.

EXAMPLE 23

L-N,N-dimethylcysteinyl-2′,6′-xylidide hydrochloride

Sodium was added in small pieces to the product of Example 21 (1.1 g.) in liquid ammonia (50 ml.) until a permanent blue color was obtained. The color was discharged by the addition of a little ammonium chloride and the ammonia was then evaporated in a stream of nitrogen. The residue was dissolved in dilute hydrochloric acid from which oxygen had been boiled out and the solution washed with chloroform (to remove corresponding cystine derivative) and evaporated in vacuo. The residue was extracted with ethanol and the liquor, after removal of insoluble matter by filtration, again evaporated to dryness. Repetition of the operation with acetone gave crystalline (0.67 g.) L-N,N-dimethylcysteinyl-2′,6′-xylidide hydrochloride on evaporation of the solvent. Recrystallization from isopropanol, gave hygroscopic prisms, M.P. 190° C. with decomp., $[d]_D^{20} + 278°$ (c.=1, $H_2O$).

*Analysis.*—Calcd. for $C_{13}H_{20}N_2OS \cdot HCl$ (percent): C, 54.0; H, 7.3; N, 9.7; S, 11.05. Found (percent): C, 53.5; H, 7.4; N, 9.3; S, 10.9.

EXAMPLE 24

DL-S-benzyl-N,N-diethylcysteinyl-2′,6′-xylidide

Hydrogen bromide (17 g.) was bubbled through a cooled solution of benzylthiomethyl chloride (12 g.) in dry ether (20 ml.). Removal of the solvent in vacuo gave benzylthiomethyl bromide as an oil of B.P. 75–81° C./0.1 mm. Di-t-butyl diethylaminomalonate (13.5 g.) was added dropwise to a stirred suspension of ether washed sodium hydride (2.3 g., 50% suspension in oil) in dry tetrahydrofuran (150 ml.). After the initial reaction had subsided the reaction was warmed on a water bath (10 min.) to give a clear solution and benzylthiomethyl bromide (10 g.) was added dropwise. After 1 hour at room temperature the reaction mixture was heated on a steam bath (for 3 hours), water was then added and the product was extracted first into ether and thence into 2 N HCl. After basification of the aqueous phase the liberated oil was collected in ether, dried (MgSO₄) and evaporated to leave di-t-butyl diethylamino (benzylthiomethyl) malonate as an oil (9.47 g.), of B.P. 145° C./0.05 mm. This ester (1.2 g.) was heated on a steam bath for 2 hrs. with 2 N HCl (5 ml.) and the cooled solution was treated with De-Acidiate FF resin (HCO₃ form) until neutral. The filtered solution was washed with ether and evaporated to leave DL-S-benzyl-N,N-diethylcysteine as a solid (0.56 g.), M.P. 144–146° C. after recrystallization from ethyl acetate. Ethyl chloroformate (2.6 g.) was added to an ice cold solution of this acid (7.0 g.) and triethylamine (3.6 ml.) in chloroform (20 ml.), followed after 20 min. by 2,6-xylidine. After 12 hrs. at room temperature the reaction mixture was refluxed for ½ hr. and then poured into water. The residue from evaporation of the organic layer was taken up in 2 N HCl, washed with ether and extracted twice with chloroform. The chloroform extract was shaken with $Na_2CO_3$ solution (to convert the hydrochloride to free base), dried and evaporated to leave the desired product as a yellow gum (6.3 g.) which crystallized on standing, M.P. 81–86° C., raised 88–90° C. on recrystallization from light petroleum.

*Analysis.*—Calcd. for $C_{22}H_{30}N_2OS$ (percent): C, 71.3; H, 8.15; N, 7.6; S, 8.65. Found (percent): C, 71.4; H, 8.1; N, 7.18; S, 8.8.

EXAMPLE 25

DL-N,N-diethylcysteinyl-2′,6′-xylidide, hydrochloride

The S-benzylxylidide of Example 24 (1.0 g.) was debenzylated in the same manner described for its lower homologue in Example 23 to give prisms of the hydrochloride (0.64 g.), M.P. 189–192° C., from isopropanol.

*Analysis.*—Calcd. for $C_{15}H_{24}N_2OS \cdot HCl$ (percent): C, 56.85; H, 7.95; N, 8.8; S, 10.1. Found (percent): C, 56.15; H, 7.8; N, 8.4; S, 9.8.

EXAMPLE 26

DL-N,N-diethylcystinyl-2′,6′-xylidide hydrochloride

The S-benzylxylidide of Example 24 (1.0 g.) was treated with sodium in liquid ammonia in the same manner as described in Example 22. The residue after evaporation of the ammonia was taken up in water and air bubbled through until the solution ceased to give a color with sodium nitroprusside. The mixture was acidified and the product extracted into chloroform which was dried ($Na_2SO_4$) and evaporated to leave the hydrochloride (0.8 g.), M.P. 210° C. (dec.) after recrystallization from isopropanol.

*Analysis.*—Calcd. for $C_{30}H_{46}N_4O_2S_2 \cdot 2HCl$ (percent): C, 57.0; H, 7.7; N, 8.9. Found (percent): C, 56.7; H, 7.7; N, 8.7.

EXAMPLE 27

2-carbamoyl-diethylamino aceto-2′,6′-xylidide

A suspension of 2-ethoxycarbonyl-2′,6′-xylidide (4.7 g.) in 0.880 ammonia (40 ml.) was stirred overnight at room temperature. The resulting solid was filtered off, washed well with water and recrystallized from ethanol/water to give needles of 2-carbamoylaceto-2′,6′-xylidide (3.7 g.), M.P. 183–184° C. Bromine (2.2 ml.) was then added gradually with stirring to 6.87 g. of the 2-carbamoylaceto-2′,6′-xylidide in chloroform (50 ml.) at room temperature and the mixture was then heated under reflux for 1 hr. 2-Bromo-2-carbamoylaceto-2′,6′-xylidide was obtained after evaporation of the solvent in vacuo and was crystallized in needles (7.2 g.), from ether M.P. 196–197° C.

The bromo-xylidide (5.7 g.), diethylamine (3.3 g.) and absolute ethanol (40 ml.) were heated under reflux for 6 hrs. and the solvent was then removed in vacuo. The residue was taken up in water (50 ml.) and the product was extracted into ether (3× 50 ml.) Evaporation of the dried ethereal extracts left an oil (3.42 g.) which on treatment with ethereal HCl, followed by crystallization from the resulting gummy solid from isopropyl alcohol/ether, gave the hydrochloride as needles (2.1 g.), M.P. 209–210° C.

*Analysis.*—Calcd. for $C_{15}H_{23}N_3O_2 \cdot HCl$ (percent): C, 57.6; H, 7.75; N, 13.4. Found (percent): C, 57.8; H, 7.95; N, 13.2.

EXAMPLE 28

2-acetoxymethyl-2-diethylaminoaceto-2′,6′-xylidide 2-diethylamino - 2 - hydroxymethyl-aceto-2′,6′-xylidide, (2.64 g.) acetic anhydride (2 ml.) and anhydrous pyridine (2 drops) were warmed on the steam bath for 15 min. and then poured into water (100 ml.). After 16 hrs. the solid that separated was filtered, dried and recrystallized from dilute acetic acid to give needles of 2-acetoxymethyl-2-diethylaminoaceto-2′,6′-xylidide acetate (2.71 g.), M.P. 98–100° C.

*Analysis.*—Calcd. for $C_{17}H_{26}N_2O_3$ (percent): C, 66.7; H, 8.6; N, 9.2. Found (percent): C, 66.75; H, 8.65; N, 9.1.

The hydrochloride was prepared from the above acetate (2.7 g.) in the usual manner and recrystallized from isopropyl alcohol/ether to give needles (1.4 g.), M.P. 202–203° C.

*Analysis.*—Calcd. for $C_{17}H_{26}N_2O_3 \cdot HCl$ (percent): C, 59.7; H, 8.0; N, 8.2. Found (percent): C, 59.6; H, 8.3; N, 8.3.

The invention may be variously otherwise embodied within the scope of the appended claims.

What is claimed is:

1. A compound selected from the group consisting of:

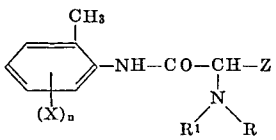

and the pharmaceutically acceptable acid addition salts thereof, wherein X is substituted in the 4' or 6' position and is selected from the group consisting of hydrogen, lower alkyl, lower alkoxy, nitro, chloro, trifluoromethyl, amino, di(lower alkyl)amino, mono(lower alkyl)amino, benzyloxy and lower alkyl mercapto; $n$ is one; R and $R^1$ are each selected from the group consisting of hydrogen, and lower alkyl; and Z is selected from the group consisting of lower alkenyl, lower alkynyl, mercapto lower alkyl, hydroxy lower alkyl, acetoxymethyl, benzylthio lower alkyl, lower alkoxy carbonyl, carbamoyl and amido-substituted lower alkyl lower alkyl disulfide.

2. A compound according to claim 1 having the structure:

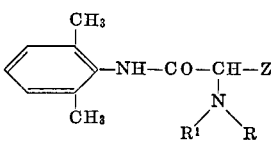

wherein R, $R^1$ and Z are as hereinbefore defined.

3. A compound according to claim 2 wherein R and $R^1$ are each methyl.

4. A compound according to claim 2 wherein R and $R^1$ are each ethyl.

5. A compound according to claim 2 that is 2-ethoxy-carbonyl-2-diethylaminoaceto-2',6'-xylidide.

6. A compound according to claim 2 that is 2-diethyl-amino-2-hydroxymethylaceto-2',6'-xylidide.

7. A compound according to claim 2 that is 2-diethyl-aminopent-4-enoyl-2',6'-xylidide.

8. A compound according to claim 2 that is 2-diethyl-aminopent-4-ynoyl-2',6'-xylidide.

9. A compound according to claim 2 that is S-benzyl-N,N-dimethylcysteinyl-2',6'-xylidide.

10. A compound according to claim 2 that is N,N-dimethylcystinyl-2',6'-xylidide.

11. A compound according to claim 2 that is N,N-dimethylcysteinyl-2',6'-xylidide.

12. A compound according to claim 2 that is S-benzyl-N,N-diethylcysteinyl-2',6'-xylidide.

13. A compound according to claim 2 that is N,N-diethylcysteinyl-2',6'-xylidide.

14. A compound according to claim 2 that is N,N-diethylcystinyl-2',6'-xylidide.

15. A compound according to claim 2 that is 2-carbamoyldiethylaminoaceto-2',6'-xylidide.

16. A compound according to claim 2 that is 2-acetoxymethyl-2-diethylaminoaceto-2',6'-xylidide.

References Cited

UNITED STATES PATENTS 2,776,241  1/1957  Priewe et al. _____ 260—471

LORRAINE A. WEINBERGER, Primary Examiner

L. A. THAXTON, Assistant Examiner

U.S. Cl. X.R.

260—470, 490, 501.17, 501.19, 558, 562, 999